Patented Apr. 29, 1924.

1,492,283

UNITED STATES PATENT OFFICE.

FREDERICK MARK BECKET, OF NEW YORK, N. Y., ASSIGNOR TO UNION CARBIDE & CARBON RESEARCH LABORATORIES, INC., A CORPORATION OF NEW YORK.

PROCESS FOR RECOVERING VALUES FROM METAL-BEARING SOLUTIONS.

No Drawing. Application filed August 3, 1922. Serial No. 579,484.

*To all whom it may concern:*

Be it known that I, FREDERICK MARK BECKET, a citizen of the United States, residing at New York, in the county of New York and State of New York, have invented certain new and useful Improvements in Processes for Recovering Values from Metal-Bearing Solutions, of which the following is a specification.

This invention is a process of separating metals from their solutions, and is particularly adapted for the precipitation of gold and silver from solutions obtained by leaching ores.

Solutions obtained by cyaniding gold and silver ores have heretofore been treated for the recovery of their values by bringing them into contact with metallic zinc, whereupon the precious metal is precipitated and an equivalent quantity of zinc goes into solution in the form of a zinc cyanide compound. This compound is not the equivalent of alkali metal cyanide for dissolving more metal, and more alkali metal cyanide must be added to bring the solution to full activity for reuse.

Aluminum has also been used for the same purpose. This metal is free from the above noted objectionable feature of depleting the effective cyanide content of the solution, but it is difficult to prepare the subdivided aluminum required. The present invention affords a method for recovering the values from the various metal-bearing solutions by the use of a material which is readily brought to any desired degree of subdivision, and which may be used in cyanide solutions without depleting their effective cyanide content.

In accordance with my invention, silicon metal is used as a precipitating agent, the reaction probably proceeding according to same such equation as the following when slightly alkaline cyanide solutions are treated:

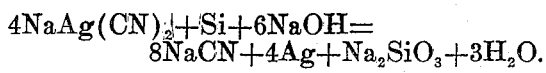

Possibly some of the silicon may be wasted by the by-reaction represented by the equation

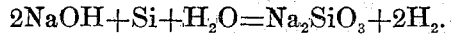

The silicon may be substantially pure or it may be contaminated with other materials. Iron is an undesirable impurity, as it enters the slime with the precipitated precious metal, from which it is somewhat difficult to separate. Such silicon alloys as reduce solutions of the kind described in a manner similar to pure silicon, are covered by the term "silicon metal" as used in the appended claims.

To accelerate the action of the silicon, it is preferably applied in powdered form, good results having been obtained with material ground to pass a 100 mesh screen. For the same reason, it is often desirable to heat the solution in contact with the silicon. The degree of heating may be varied according to the requirements of the particular case. Temperatures approaching the boiling point of the solution bring about a rapid precipitation. The invention makes possible a very high recovery of the values in the solution treated.

The slime containing the precious metal may be worked up in any suitable way, as by drying and fusing in the presence of a suitable alkaline flux.

It should be noted that silicon, because of its low atomic weight and high chemical equivalence, has a theoretical reducing power per unit of weight which is greater than that of either aluminum or zinc. In an application Serial No. 579,483, filed of even date herewith by F. M. Becket and A. L. Feild, the precipitation of heavy metals by silicon alloyed with calcium, or other activating metal, is described and claimed.

The present invention has been described in connection with the recovery of gold and silver, but it is not restricted to such use. Other heavy metals, having an electrolytic solution potential negative to that of silicon in the electrolyte employed, may be recovered from their solutions by procedure similar to that described. The term "heavy metals," as used herein, is intended to include those metals which are precipitated by silicon because of the potential relation stated, or an analogous property.

I claim:

1. Process of precipitating heavy metals from their alkaline solutions which comprises bringing the solution into contact with silicon metal.

2. Process of precipitating precious metals from cyanide solutions which comprises bringing the solution into contact with silicon metal.

3. Process of precipitating precious metals from cyanide solutions which comprises bringing the heated solution into contact with finely divided silicon metal.

In testimony whereof, I affix my signature.

FREDERICK MARK BECKET.